US009822886B2

(12) United States Patent
Dulin

(10) Patent No.: US 9,822,886 B2
(45) Date of Patent: Nov. 21, 2017

(54) TEMPERATURE CONTROLLED PURGE VALVE WITH WASHER/O-RING SEAL STACK

(71) Applicant: BAKER PRODUCTS LTD., Kingsbury, TX (US)

(72) Inventor: Robert Dulin, Kingsbury, TX (US)

(73) Assignee: Baker Products, Ltd., Kingsbury, TX (US)

( * ) Notice: Subject to any disclaimer, the term of this patent is extended or adjusted under 35 U.S.C. 154(b) by 141 days.

(21) Appl. No.: 14/884,047

(22) Filed: Oct. 15, 2015

(65) Prior Publication Data

US 2016/0109029 A1    Apr. 21, 2016

Related U.S. Application Data

(60) Provisional application No. 62/063,985, filed on Oct. 15, 2014.

(51) Int. Cl.
| | | |
|---|---|---|
| *F16K 17/00* | (2006.01) | |
| *F16K 3/02* | (2006.01) | |
| *F16K 31/00* | (2006.01) | |

(52) U.S. Cl.
CPC .......... *F16K 3/0254* (2013.01); *F16K 31/002* (2013.01)

(58) Field of Classification Search
CPC ....... F16K 31/002; F16K 3/243; F16K 3/0254
USPC ................................. 137/59, 79, 216, 315.28
See application file for complete search history.

(56) References Cited

U.S. PATENT DOCUMENTS

| | | | | | |
|---|---|---|---|---|---|
| 1,511,302 | A | * | 10/1924 | Schnetzer | F16K 3/243 137/625.37 |
| 1,526,718 | A | * | 2/1925 | Opp | E03B 7/12 137/13 |
| 2,778,598 | A | * | 1/1957 | Bolling, Jr. | F16K 3/243 251/333 |
| 4,165,035 | A | * | 8/1979 | Maltby | F02D 37/02 137/625.26 |
| 4,205,698 | A | * | 6/1980 | Hucks | E03B 7/12 137/62 |
| 4,336,946 | A | * | 6/1982 | Wheeler | F16J 15/32 277/529 |
| 4,450,856 | A | * | 5/1984 | Kocher | F16K 27/102 137/315.28 |
| 6,374,849 | B1 | * | 4/2002 | Howell | E03B 7/10 137/218 |
| 6,892,747 | B2 | | 5/2005 | Dulin | |
| 9,482,357 | B2 | * | 11/2016 | Dulin | F16K 31/002 137/2 |

(Continued)

*Primary Examiner* — Umashankar Venkatesan
(74) *Attorney, Agent, or Firm* — Jackson Walker, LLP

(57) ABSTRACT

In a valve having a body with a sealed working fluid chamber, a bore and a valved fluid chamber, the valved fluid chamber having an inlet and outlet and a seat between the inlet and the outlet, a piston for extending through the bore from the working fluid chamber to the valved fluid chamber, a spring for biasing the piston away from the seat and a working fluid for receipt in the working fluid chamber. Applicant provides an improvement comprising a seal stack assembly for entrainment, under compression, upon the piston and in the piston chamber between a working fluid chamber end wall and a first end of the piston, wherein the first end of the piston is located in the working fluid chamber and a second end in the valved fluid chamber.

9 Claims, 14 Drawing Sheets

(56) References Cited

U.S. PATENT DOCUMENTS

2006/0249914 A1    11/2006  Dulin
2014/0230907 A1*  8/2014  Tallos ..................... F28F 9/00
                                                         277/329

* cited by examiner

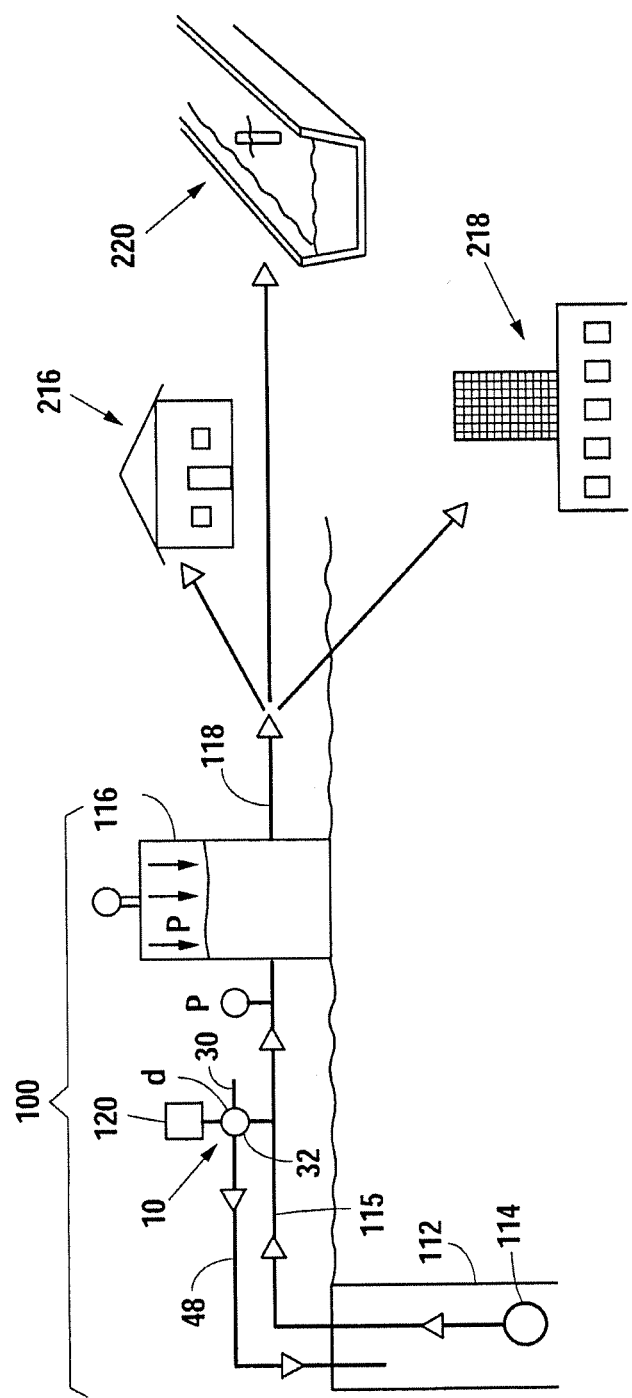

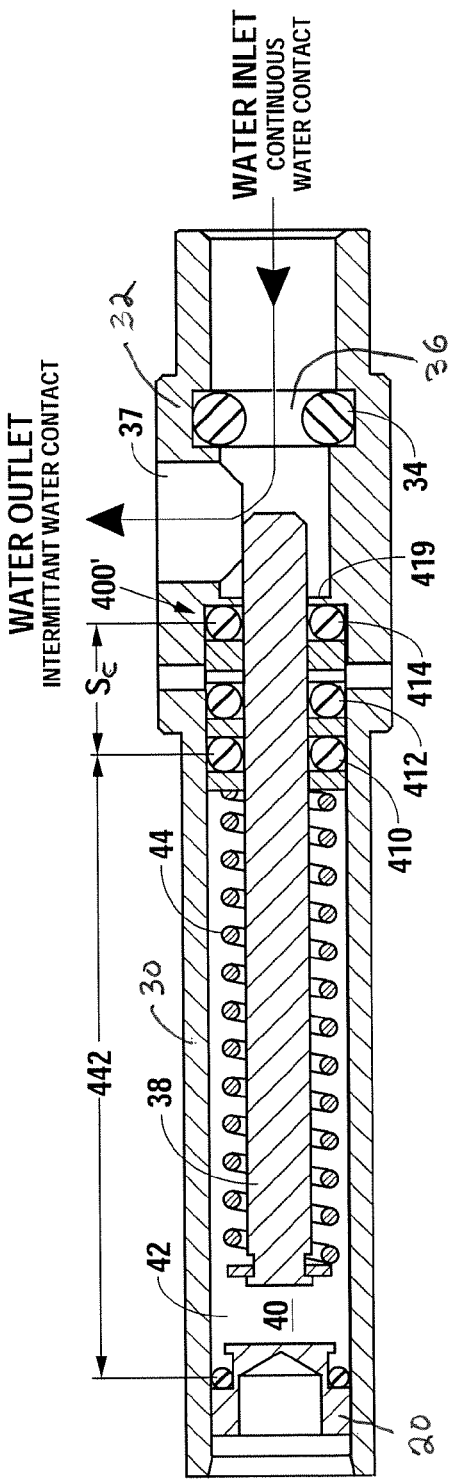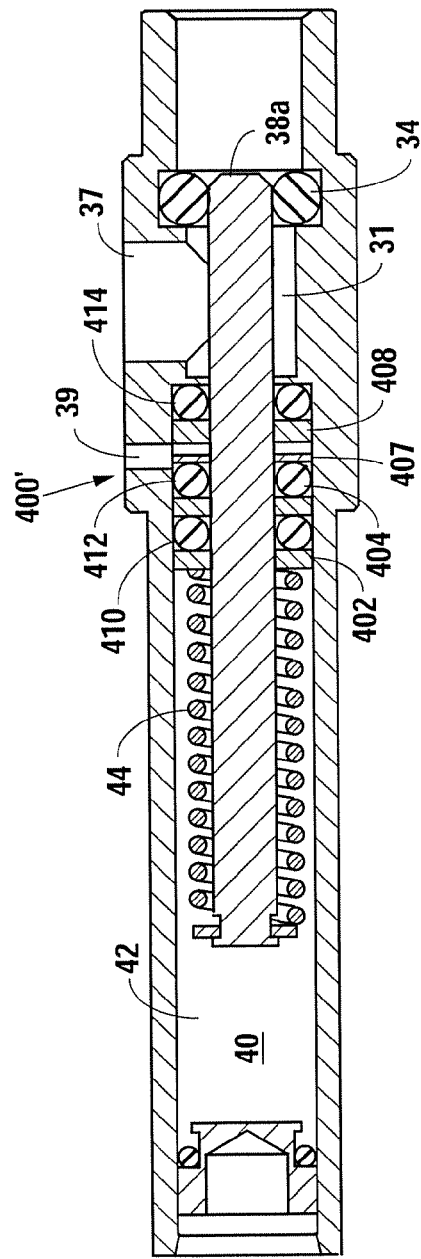
Fig. 3A
Fig. 3B

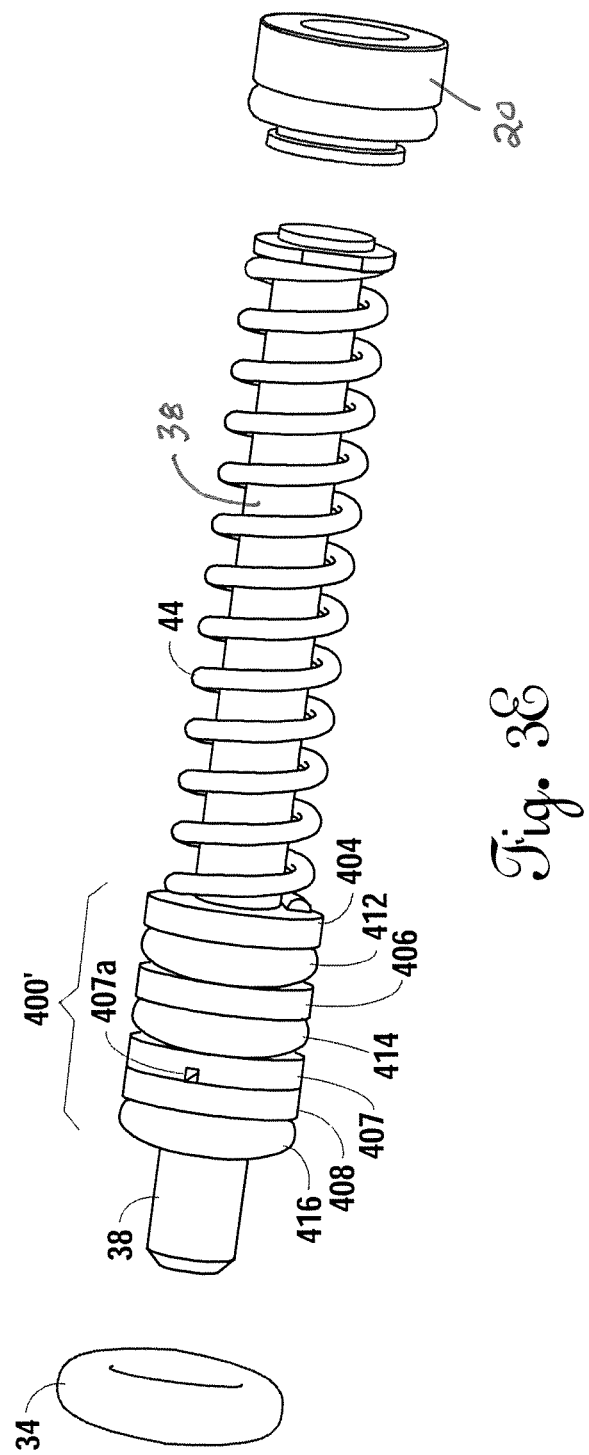

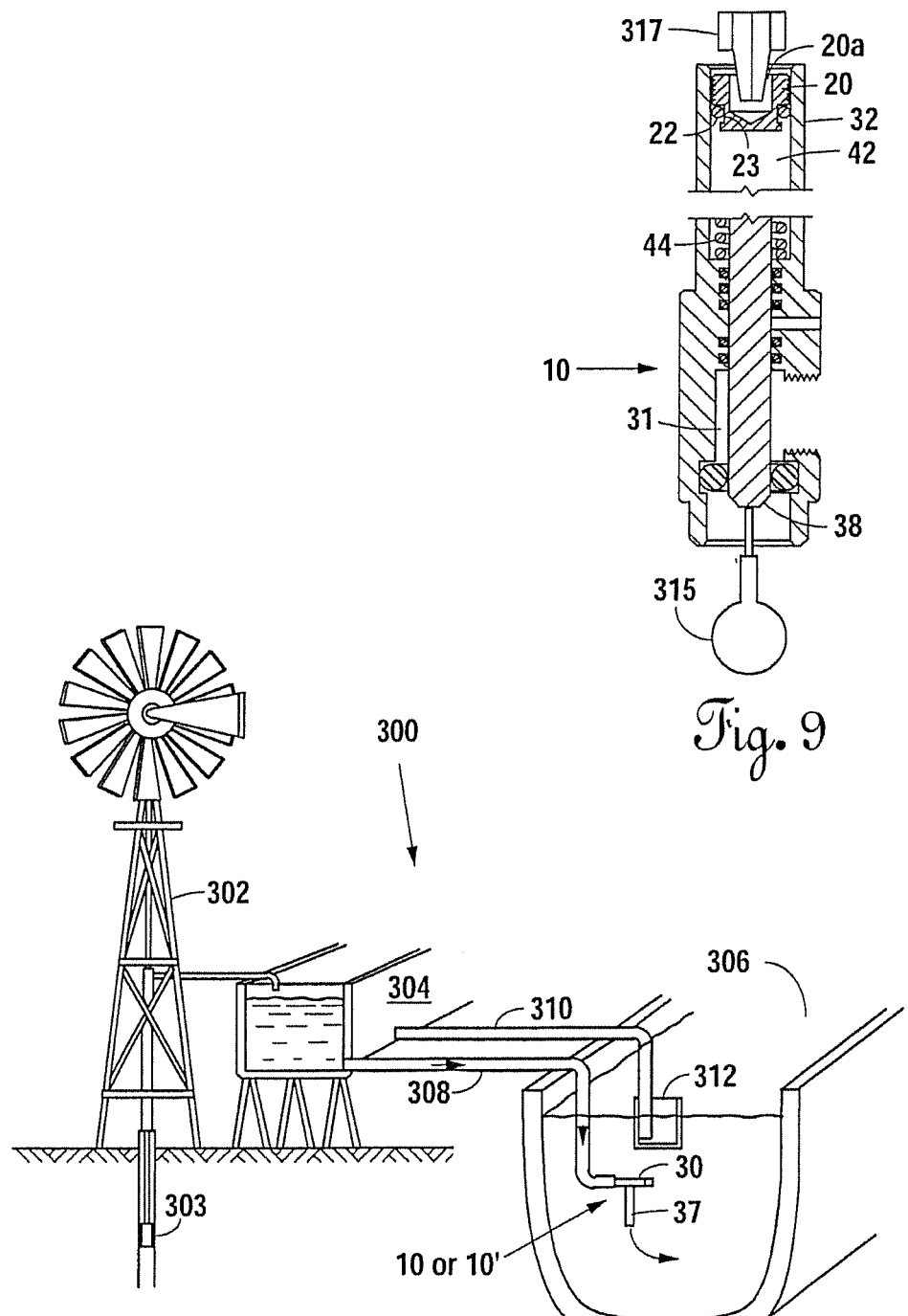

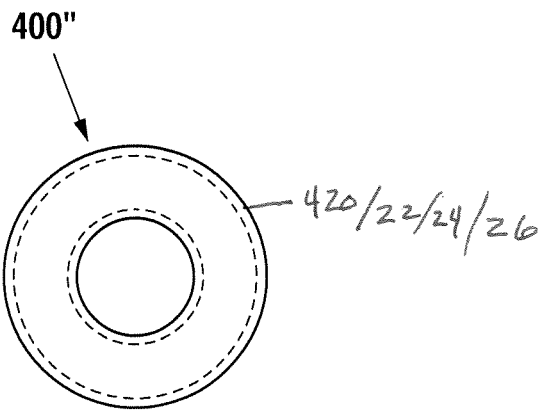
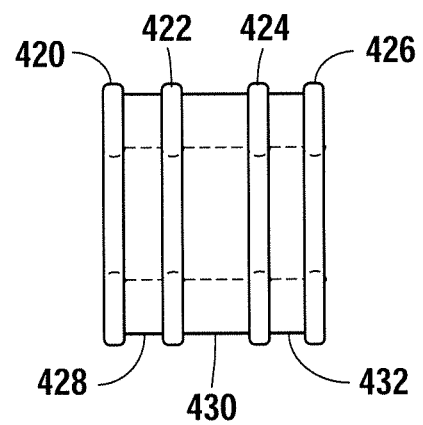
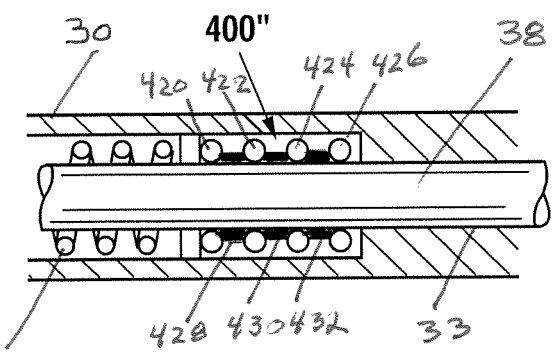

TEMPERATURE CONTROLLED PURGE VALVE WITH WASHER/O-RING SEAL STACK

This is a utility application, which claims priority to and the benefit of U.S. Application No. 62/063,985, filed Oct. 15, 2014, and incorporates herein by reference U.S. patent application Ser. No. 14/065,857, filed Oct. 29, 2013; U.S. patent application Ser. No. 11/275,135, filed Dec. 13, 2005; and U.S. Pat. No. 6,892,747.

FIELD OF THE INVENTION

Temperature controlled valve for water systems, including water well and water softener freeze protection, as well as other system water flow control.

BACKGROUND OF THE INVENTION

Water well and water softener systems use pressurized water in pipes or other elements that are sometimes exposed to cold temperatures. Freeze protection in the past has typically utilized wrapping exposed elements with electrical heat tape or insulation or a combination of both methods. While these solutions are often satisfactory for most conditions, there exists a need for a non-electrical, non-passive system that engages pressurized elements of water supply assemblies for actively preventing freeze-up by temperature, with the use of the pressurized systems water, to purge the chilled water and subsequently, and as a direct result of purging, replace with warmer water.

This action prevents the devices from freezing. There is also the need for flow control in water systems wherein water cooler than ambient is needed downstream of a water supply.

SUMMARY OF THE INVENTION

A water carrying pressure bearing system comprising a source of water pressure is provided. Water bearing lines or water bearing containers are sometimes exposed to external air temperature fluctuations or ambient water conditions. Downstream of the source of water, freeze protection is provided. Protected system elements are in fluid communication with a water bearing line and the source of water pressure. In the water bearing line, there is a purge valve with a working fluid which may undergo a phase change, the working fluid typically having a freezing point above 32° F., the valve in fluid communication with the water bearing line. In one embodiment, the valve is biased to a normally closed position at temperatures above the freezing point of the working fluid. The valve opens as the working fluid contracts and freezes. The working fluid may be, in one embodiment, selected from fluids with freezing points being in the range of about 32° F. to about 50° F. or preferably about 34° F. to 45° F. The valve may have an outlet engaged therewith to carry away water received therein when the valve opens responsive to cooling air on an air sensing portion. The valve may be moderated by a water temperature sensing side. The protected elements, in three embodiments, comprise a water softener controller valve, a water trough, and a pressure switch for any number of uses or systems.

In a first embodiment of several, Applicant provides an active, non-electrical, air and water temperature responsive purge valve downstream of a well water pump and upstream of a pressure sensing switch in a water distribution system, which may include a water well and pressurized water tank.

In a second embodiment, Applicant provides a similar valve on a pressure line downstream of a water softener. Fluid flow directly from the well pump, tank or other pressure source may be about 56° F. to 65° F., no matter the ambient temperatures. Purge valves in both embodiments are typically located in outside air, where they may be subject to contact with both the water in the system and the outside air. The valve contains a chamber having a material selected from materials which freeze between the temperatures of about 32° F. and 50° F., most preferably about 41.5° F. In doing so, the freezing working material contracts to allow a spring biased valve to open on a water pressure line, which valve then dumps or bypasses fluid from a high side (which may be well water pressure tank pressure) to a low side bypass, which may be ambient pressure. In doing so, pressure relief in the system at a temperature above the freezing point of water, generates fluid flow from the well and/or pressure tank or other source, thereby preventing freeze-up. In a preferred embodiment of Applicant's valve, there is a range of cross-sectional area ratios between water contacting elements of the valve and air contacting elements of the valve.

In a valve having a body with a sealed working fluid chamber, a bore and a valved fluid chamber having an inlet and outlet and a seat between the inlet and the outlet, a piston for extending through the bore from the working fluid chamber to the valved fluid chamber. A spring is provided for biasing the piston and a working fluid is provided for receipt in the working fluid chamber. The working fluid is, in one embodiment, an alkane. An improvement comprising a seal stack assembly is provided for engaging the piston in the piston chamber between a working fluid chamber end wall and a first end of the piston. The first end of the piston is located in the working fluid chamber. A second end of the piston is in the valved fluid chamber. The seal stack assembly comprises at least one elastomeric element and one hard element, both elements coupled to the piston such that the spring urges the second end of the piston in the direction of the first end. The hard element may be a washer with at least one slot in a side wall thereof.

A valve is provided having a body with a sealed working fluid chamber, a bore and a valved fluid chamber. The valved fluid chamber has an inlet and outlet and a seat between the inlet and the outlet. A piston is provided for extending through the bore from the working fluid chamber to the valved fluid chamber. A spring is provided for biasing the piston away from the seat. A working fluid is provided for receipt in the working fluid chamber. A seal stack assembly is engaged, under compression, upon the piston and in the working fluid chamber between a working fluid chamber end wall and a first end of the piston. The first end of the piston is typically located in the working fluid chamber and a second end in the valved fluid chamber proximate the seat such that temperature changes cause the piston to move responsive to expansion and contraction of the working fluid between a seated and an unseated position, the unseated position for the passage of a fluid past the seat.

A thermally actuated valve is provided comprising: a housing having walls defining an inlet adapted to receive water under pressure, an outlet, a first chamber fluidly connecting the inlet to the outlet, a second chamber having a near end and a removed end. Walls define a bore separating the first chamber from the second, longitudinal chamber. A resilient seat defines a seat plane, the seat for engaging the housing, the seat adjacent the inlet of the first chamber of the housing. A piston has a first end that includes a nose and a second end and a longitudinal axis. The piston is partially disposed in the first chamber, partially and slidably disposed in the bore, and partially disposed in the second chamber. The piston's longitudinal axis is aligned substantially perpendicular to the seat plane. A spring engages the piston, so as to bias the piston towards the removed end of the second chamber. A seal stack assembly fluid seals between the piston and walls of the second longitudinal chamber and is sandwiched under compression between the spring and walls of the second chamber to prevent fluid transfer between the first chamber and the second chamber. A working material is sealed in the second chamber to move the piston responsive to temperature changes between a seated position and an unseated position.

BRIEF DESCRIPTION OF THE DRAWINGS

FIGS. 1 and 2 are schematic illustrations of Applicant's novel valve as used in a water well system and a water softener system.

FIGS. 3A and 3B are cross-sectional views (valve opened and valve closed) of an alternate preferred embodiment of the purge valve in which a stack assembly is used in the fluid compartment, rather than O-rings 33a/33b in the piston rod channel or bore between the fluid chamber of the working fluid and the water side.

FIG. 3E is a perspective view of an alternate preferred embodiment of the stack assembly on a piston for use in a purge valve.

FIG. 7A, warming a water source responsive to cool ambient temperatures; FIG. 7B, cooling a water source responsive to warm ambient temperatures; and FIG. 7C, valve closed condition, the valve not affecting the flow of water through the system.

FIG. 8 is a partially schematic view of a cattle trough water flow system that is adapted to use Applicant's novel valve in any of the embodiments illustrated.

FIG. 9 is a cross-sectional view of a valve showing a method of calibrating Applicant's mechanical valve so it opens and closes at the proper temperatures.

FIGS. 10A, 10B, and 10C illustrate an alternate preferred embodiment of Applicant's stack assembly, which may be referred to as a "integral" one-piece stack assembly.

DETAILED DESCRIPTION OF THE PREFERRED EMBODIMENTS

Figure 1A:
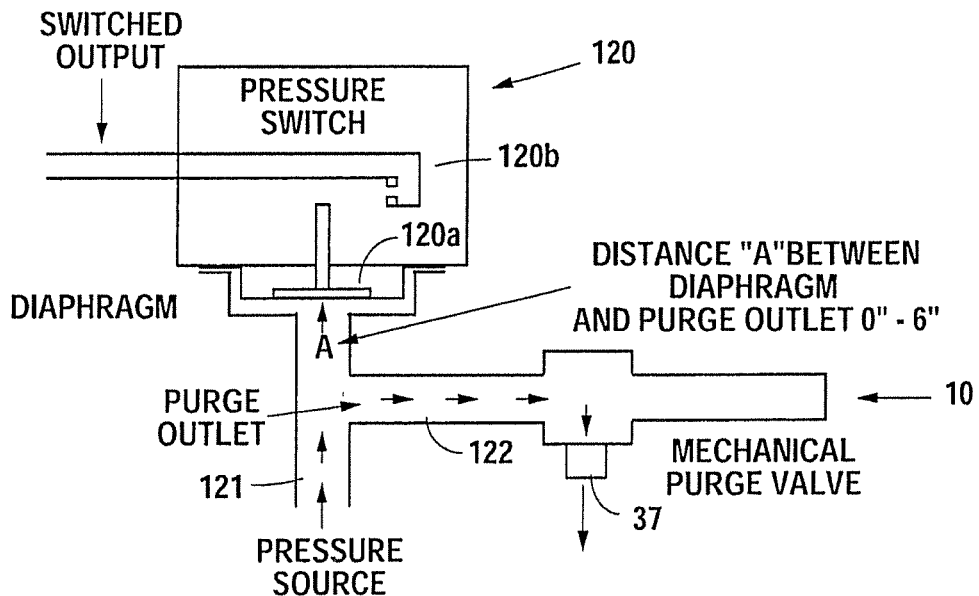
FIG. 1A is a schematic illustration of details of the relationship between a mechanical purge valve and a pressure switch.
Figure 1B:
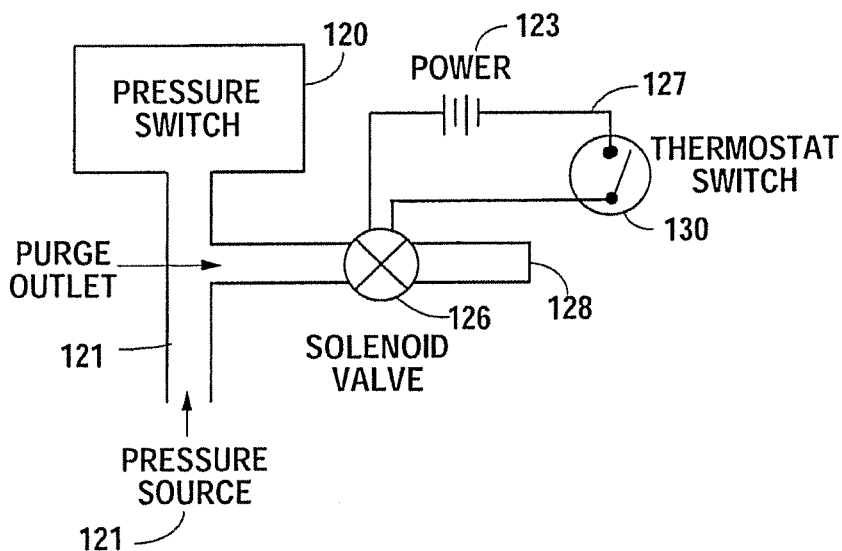
FIGS. 1B and 1C are illustrations of an electrical embodiment of Applicant's purge valve for use in close proximity to a pressure switch.
Figure 1C:
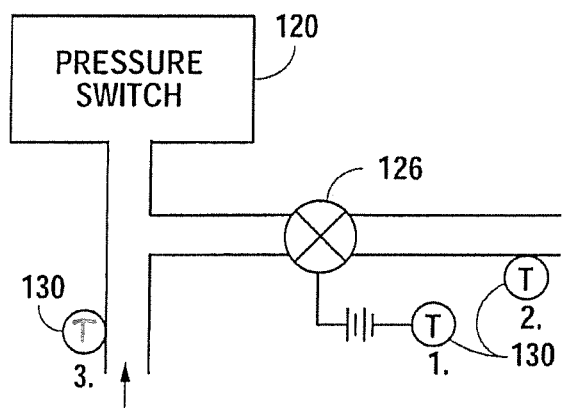
Figure 2:
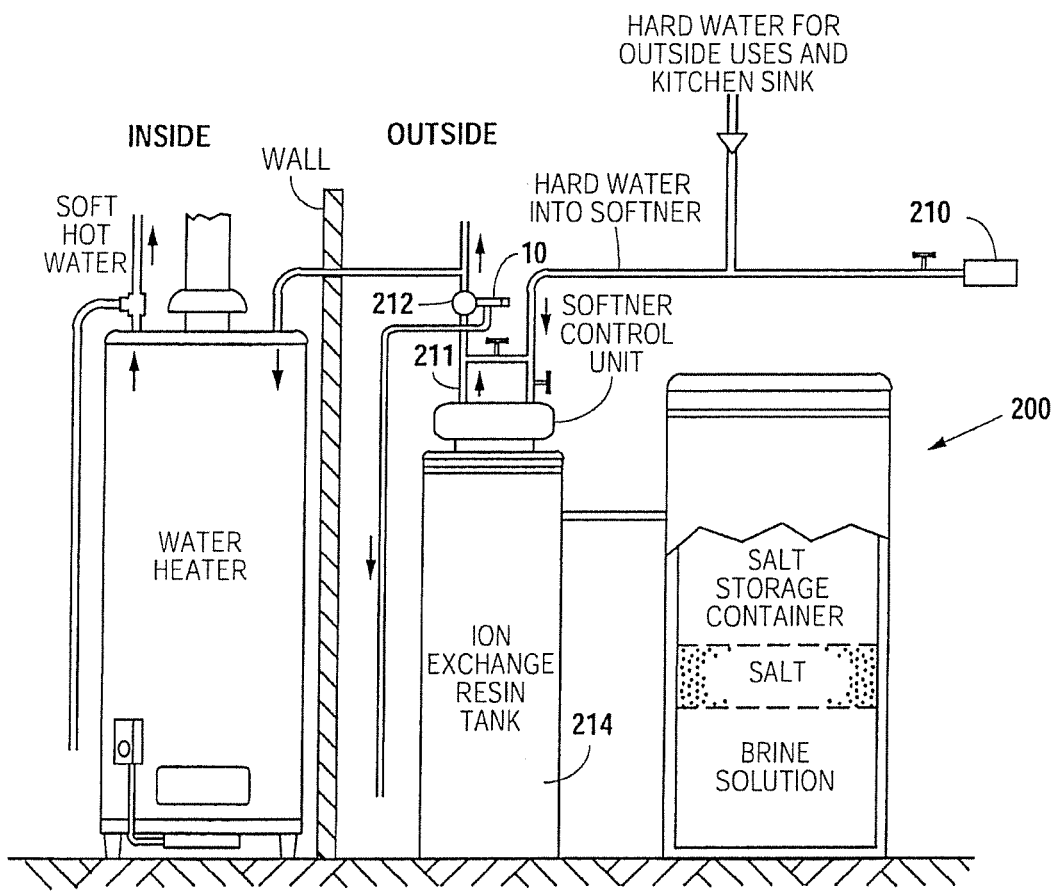
Figure 3:
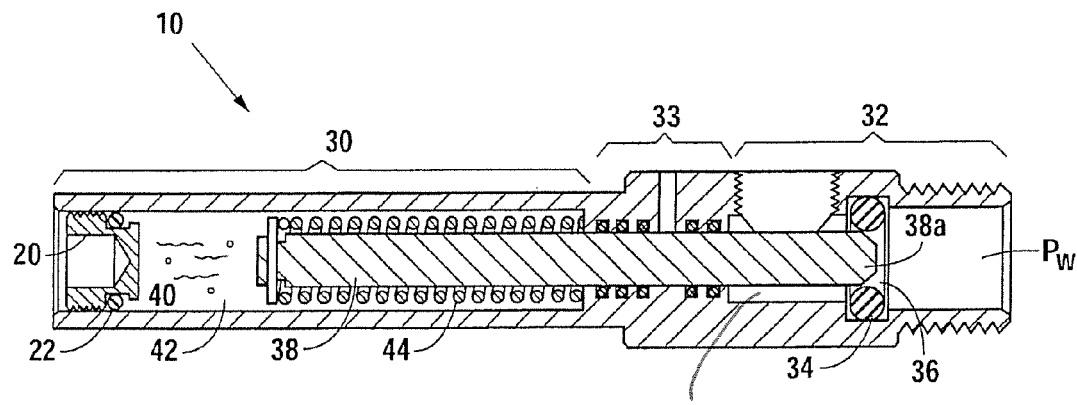
FIGS. 3 and 4 illustrate side cross-sectional views of an example embodiment of Applicant's novel valve in a closed and open position, respectively.
Figure 4A:
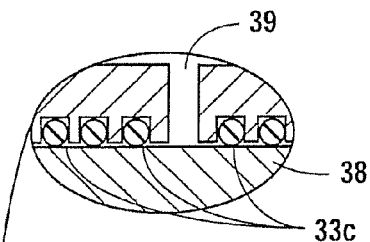
FIG. 4A is a cross-sectional detail view of the multi O-ring seal of FIG. 4 showing the lubricant used therewith.
Figure 4:
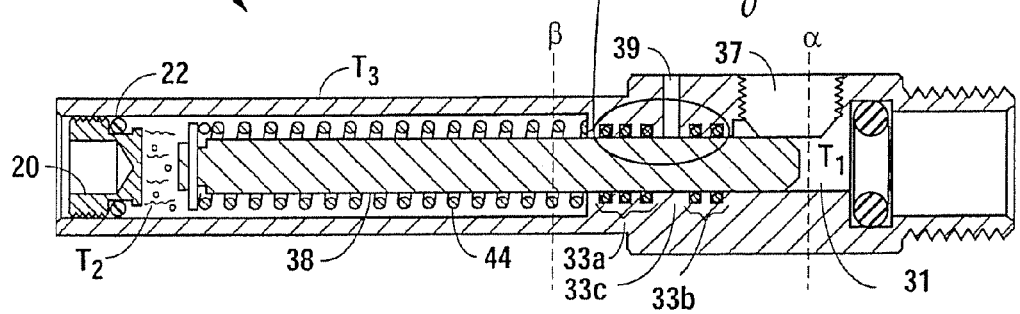

FIG. 1 illustrates Applicant's purge valve 10 as part of a water well assembly 100 and FIG. 2 illustrates Applicant's valve as part of a water softener assembly 200. FIGS. 3, 4, and 4A illustrate details of an example of purge valve 10 having a first body portion 30 and a second body portion 32, with a sealing area or piston bore 33 therebetween, and a valve seat 34. A temperature/pressure responsive piston 38 opens a bypass port 36, and controls the flow of water through the bypass port 36 when the temperature drops below a set point, such as in the range of about 32° F. to 50° F., which set point is typically about 10° above the freezing point of water. Piston 38 is responsive to a change in volume (at phase change) of a working fluid 40, which working fluid fills a fluid chamber 42 in the first body portion 30 of the valve. When working fluid 40 (which is typically not water based) in chamber 42 reaches a point, it will contract as it loses heat and changes phase from a liquid to a solid at the freezing point of the fluid, and will cause piston 38, biased open by a spring 44, to retract from valve seat 34. This allows water well and/or pressure tank pressurized water to flow through the bypass port 36 and out an outlet or purge port 37. Further details of Applicant's novel valve will be set forth after an explanation of its use in the system.

Turning to FIG. 1, it is seen that system 100 may include a water well 112, such as a domestic or commercial (municipal) water well, which may have a pump 114 (mechanical or electrical), such as submerged pump or any other pump suitably located to draw water from below the ground level of the well. A water supply line 115 provides the water under pressure through a pressure switch 120, to a pressurized water tank 116. Demand from users downstream of pressure tank 116 will allow water to flow out through line 118 to provide their needs. Pressure switch 120 is typically provided somewhere in the system (typically at, or upstream of pressure tank 116), responsive to pressure changes in tank 116, such that below a low set pressure, pump 114 will be activated and provide water to tank 116, and above a high set pressure, will shut off.

FIG. 1 illustrates Applicant's well water well assembly 100 providing various downstream water uses of the water from the water well assembly 100. These uses may include use in a commercial or residential structure 216, in a cooling tower, such as those known in the art for cooling the hot side of air conditioners 218, and a livestock animal trough 220, as set forth in more detail hereinbelow.

Pressure switch 120 may be of the diaphragm type and when exposed to temperatures near or below 32° F., especially when windy, can freeze up faster than any other part of the well assembly. They then become non-responsive to pressure changes in the system. When this occurs, a pressure drop in the pressure tank will not initiate a signal to start the pump, and the system has failed mechanically and is subject to further freezing and potential damage to equipment.

Use of Applicant's purge valve 10 in the system, typically at or upstream of tank 116 and typically close to the pressure switch, will help ensure that under even severe weather conditions, the purge valve, acting independently of the pressure switch, will help prevent freeze-up.

Applicant's water well assembly may have pump 114 which may be a mechanical water pump, such as a mechanical or a sucker rod pump or an electrical pump (or any other suitable pump). It may have a storage tank, which may be a pressurized storage tank, gravity feed storage tank or any suitable water storage tank for receiving water pumped from a domestic, commercial or agricultural water well. Typically, one or more water flow control devices are a part of the water well assembly to control the water pumped as it is used by downstream elements of the water well assembly.

FIG. 1A illustrates a schematic detail view showing the manner in which Applicant's purge valve 10 may be used with a fluid pressure source pressurizing a pressure switch.

In FIG. 1A, a pressure switch 120 as known in the art, may include diaphragm 120a responsive to water pressure in pressure switch mount pipe 121, may engage one arm of electrical contacts 120b to close or open the contacts and energize/de-energize a remote pump responsive to water pressure in a pressure source and responsive in some embodiments to pressure in a pressure tank as set forth herein. A tee or horizontal member 122 may extend perpendicular to the typically vertical pressure switch mount pipe 121. In any case, Applicant's purge valve 10 is typically located below the pressure switch 120 and in a manner that it may open and gravity drain, for example, through purge port 37, fluid from contact with the diaphragm. This will prevent freeze-up from damaging the diaphragm. It will also initiate a pump "on" condition by draining some water from tank 116. The pump will re-pressurize the system with, typically warmer water which, in turn, will help shut the purge valve 10. It will also initiate an "on" condition, by draining water from the pressure tank, which forces the pressure switch to turn the water well pump on, and refill the tank and piping with warmer water.

FIG. 1A illustrates that, in one embodiment, purge valve 10 is usually within a minimum distance (measured by fluid pathway) of about ¼ inch to about 12 inches from the diaphragm of the pressure switch. This will help protect and prevent freeze-up of the pressure switch.

FIGS. 1B and 1C illustrate an alternate preferred embodiment of Applicant's system. Wherein the other systems set forth herein use a mechanical purge valve 10, it is noted that, in conjunction with a pressure switch, a solenoid purge valve 126 powered by a power circuit 127 may be used in close proximity to the pressure switch so that it may drain from a gravity fed outlet 128, water or other fluid at a pressure source 121. That is to say, instead of a mechanical valve 10, a solenoid valve 126 may operate with a circuit which includes power 123 (battery, DC, AC, solar or any suitable source) and a thermostat switch 130. Thermostat switch 130 will typically be set for the same approximate range as the mechanical purge valve, that is closing at least several degrees above freezing and opening solenoid valve 126 to allow fluid to drain before freeze-up at the pressure switch. As seen in FIG. 1C, thermostat switch 130 (or a sensor therefor) may be placed adjacent or on elements, metallic or non-metallic, downstream of solenoid valve 126. At position 2 or 3 as seen in FIG. 1C, when warmer water from a well, for example, flows through an open the solenoid valve, thermostat switch 130 may open causing the solenoid valve to close, thus re-pressurizing the pressure switch with, typically, warmer water. Position 1, FIG. 1C, locates switch 130 in air, while positions 2 and 3 are both water and air temperature exposures.

Further details of purge valve 10 may be appreciated with reference to FIG. 3. First portion 30 may be referred to as "air exposed" portion and contains an external surface, typically cylindrical and constructed of brass or other suitable metal, which also may be referred to as the air temperature sensing portion of purge valve 10. A second portion 32 has an interior that may be subject to the presence of stationary water (or empty) when the valve is closed and which carries water in an open or "protect" mode and is subject to the temperature bias of the purged water as it is discharged. In an alternate preferred embodiment, the body defined by elements 30/32/33 may be made of plastic, such as Delrin®.

In a situation where the air temperature cools suddenly, for example, with the passage of a sudden cold front, first portion 30 will cool more quickly, subject as it is to exposure with the air, especially moving air, and second portion 32 will lag, subject to the water or proximity to system water and the contact with the water within (valve open) body portion 32 or proximate (valve closed) to body portion 32. Water is known to moderate temperature changes (it has a much higher specific heat than the material, typically brass or other suitable metal, of which the valve body is made). Warm water within portion 32 will typically provide warmth to portion 32, which by conduction will provide some heat to portion 30 as it drops below the set point. Thus, portion 32 will have the effect of moderating air caused temperature changes of portion 30, so that especially with sudden changes of air temperature, sufficient heat may flow from portion 32 to 30 to moderate and prevent too quick a freeze-up of working fluid 40 (and thus a draining of water from the system).

FIGS. 3 and 4 illustrate purge valve 10 in a closed and open position irrespectively. Working fluid chamber 42 is sealed at a first end by removable threaded cap 20. Cap 20 may use an O-ring 22 on a shoulder thereof to tightly seal working fluid 40 in fluid chamber 42. Typically, the working fluid will be sealed into the chamber when in its liquid phase. The set point is calibrated by advancing the plug until the nose 38a of piston 38 is sealed in seat 34 which, in one embodiment, is an O-ring (see also FIG. 9). Spring 44 biases valve piston to the open position (see FIG. 4). However, fluid pressure of working fluid 40 in fluid chamber 42 holds the valve in the seated or closed position at temperatures above the set point. At these temperatures, the working fluid will expand slightly (compared to set point) to maintain a good seat, especially in an elastomeric seat, such as valve seat 34. However, as the air temperature cools through the set point, the working fluid will begin to undergo phase change and contract, thereby temperature proportionally opening valve as in FIG. 4. This will allow water to pass into the valve and out the port, utilizing the ambient pressure PW (see FIG. 3), which pressure is generated by the pressure tank and/or pump.

FIGS. 4 and 4A illustrate the use of an anti-seize lubricant 33c, which has a freezing point less than water. These lubricants may be used to fill in, around, and between the O-rings that separate the chamber containing the working fluid and the chamber through which purged fluid, typically water, will pass out of when the purge valve is opened. Tolerances between the piston and the body may be plus or minus 0.001 inch. It is seen the lubricant tends to be held in between the spaces that separate adjacent O-rings and the piston walls where they contact the body.

When the purge valve opens, water will be drawn through the channels of second body portion 32 and out the drain port to dump onto the ground, to recycle in the well (as illustrated in FIG. 1) or for other suitable disposal. This water will typically be warmer than air temperature and will warm the surrounding material of portion 32. Heat by conduction will flow to portion 30.

Working fluid 40, in certain embodiments, will undergo a phase change at about 41.5° F. (5.5° C.), which is approximately 10 degrees above the Fahrenheit freezing point for pure water. One such material is an alkane known as Tetradecane ($C_{14}H_{30}$), which undergoes a volumetric contraction of about 20% at the freezing/melting point (range 39-43° F.) as measured from a liquid phase to a solid phase. Preferably, working fluid 40 would undergo a phase change from liquid to solid contracting at the phase change, which freezing (melting) point is in the range of about 6° to about 18° F. above the freezing point of water in one embodiment.

Figure 2A:
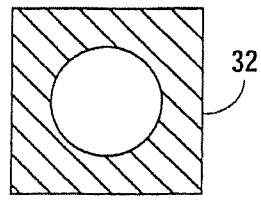
FIGS. 2A and 2B illustrate cross-sectional areas of a first, water contacting portion and a second, air contacting portion, respectively, of Applicant's novel valve.
Figure 2B:
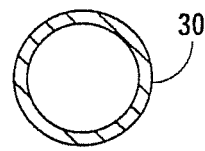

In some embodiments, cross-sectional area α of second body portion 32 is typically larger than cross-sectional area β of first body portion 30 (see FIGS. 2A and 2B). The metallic or plastic elements defining the body of the valve may, in particular embodiments, be brass (specific heat of approximately 0.1). The range of the larger area, that is, the cross-sectional area of second body portion 32 which contacts the water may be in the range of 1.2 to 4 times the cross-sectioned area of the air sensitive first body portion 30.

Figure 6:
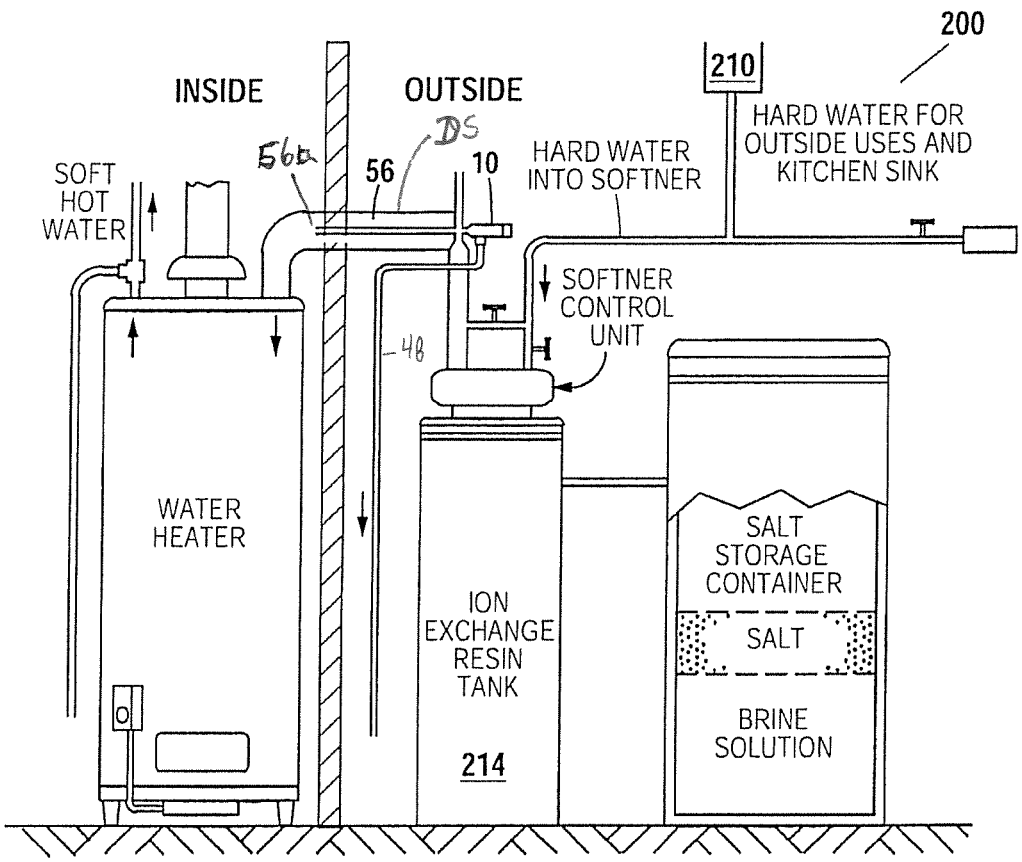
FIGS. 6 and 6A illustrate the use of a remote purge port for pipe downstream of the purge valve.
Figure 6A:
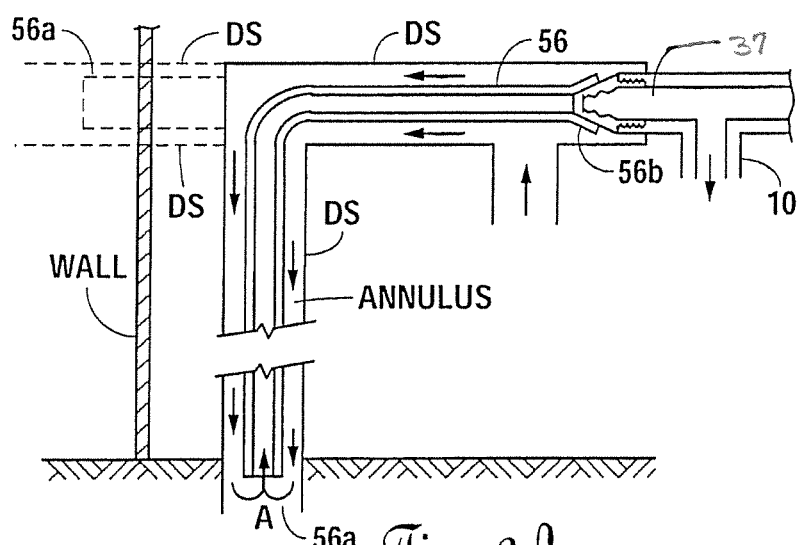

Turning to FIGS. 2, 6, and 6A, a water softener system 200 is illustrated, which has a water softener pressurized on a pressurized water source 210, which may be water well or water pressure tank or city water. FIGS. 6 and 6A illustrate Applicant's use of purge valve 10 on a water softener assembly 200 downstream of a water softener tank 214. Water from water softener tank 214 is pressurized, and purge valve 10 is typically exposed to ambient conditions. Pipes 212 downstream of tank 214, and other elements of the system may be exposed to cold air, as in a garage, shed or outside of a building. As such, they may benefit from use of Applicant's purge valve 10, which may be "teed" or otherwise installed into a water pressure bearing outlet, such as soft water outlet line 211, that is subject to cold temperatures. In the same fashion as set forth with the water well assembly 100, cold air temperatures will generate purging of the pressurized lines, which flow will maintain the circuit in a flow condition, for a period of time, to prevent freeze-up. The use of Applicant's valve is an alternative to leaving faucets on inside the house (so as to keep water flowing in system), which can waste water if ambient temperatures are above freezing and may let pipes freeze if the faucet discharge is less than what is needed for very cold temperatures. The use of Applicant's purge valve 10 in either assembly will reduce such water wastage, while preventing the assembly from freezing.

Figure 5:
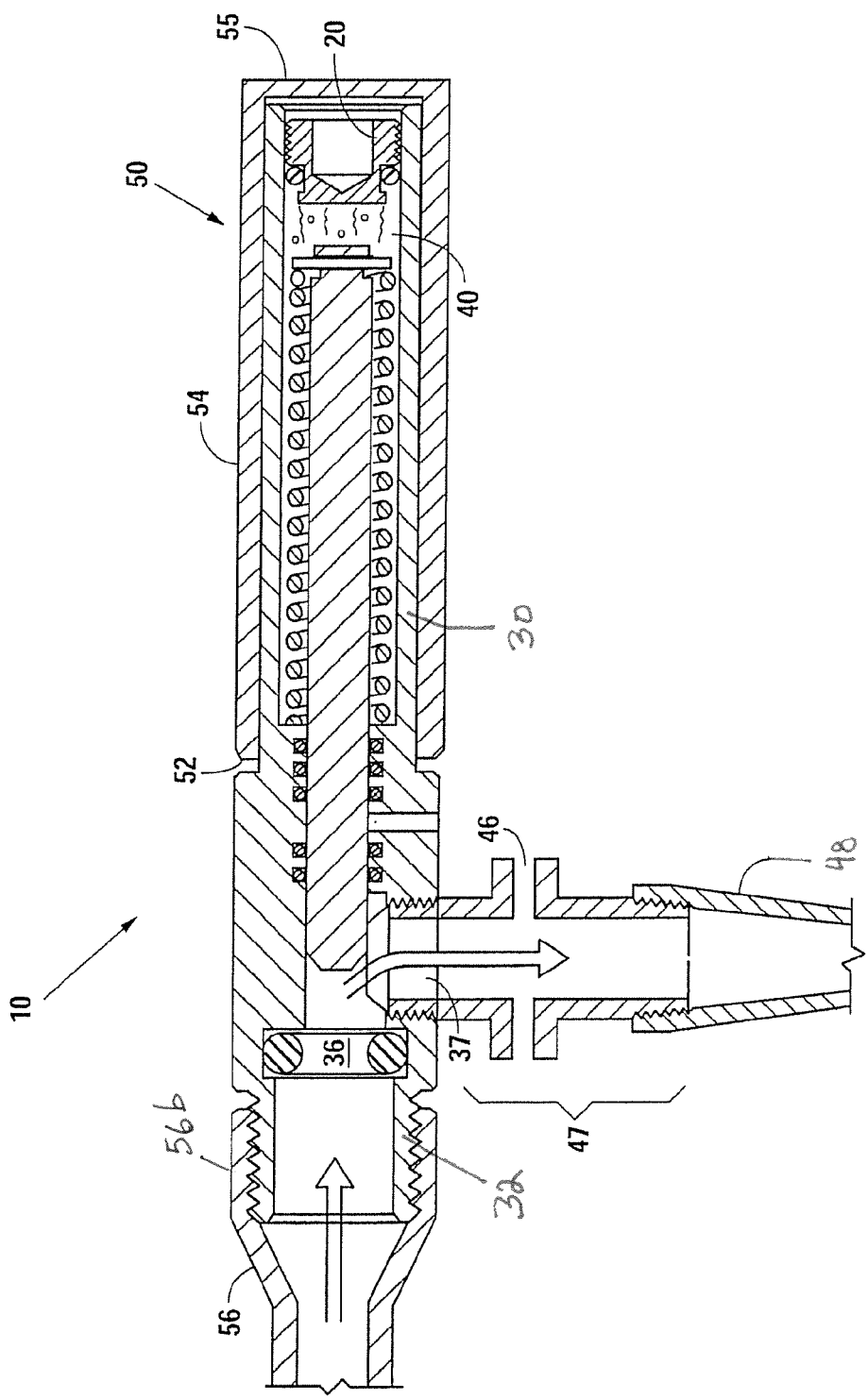
FIG. 5 is a side elevation cutaway of the purge valve (open).

FIG. 5 illustrates the use of a vacuum break 46 in a threaded drain fitting 47, which will help prevent siphoning when the removed end of a drain tube 48 has water in it. Vacuum break 46 will also provide a water outlet, should any portions of drain line 48 freeze up. Drain tubes 48 are typically placed so that the removed end thereof is adjacent to a drain or goes back into the well.

FIG. 5 also illustrates the use of a sleeve or jacket 50, which is typically shaped with an open end 52 and a body 54, and a closed end 55, that will slip on and snugly engage the exterior portion 30 to act as a shield and insulation from the possibilities of wind, sleet, snow, ice and/or their accumulation, from affecting the air temperature sensitive second body portion 30 of purge valve 10. Such an insulation jacket 50 may be made from 1/10 inch pliable plastic or suitable material typically with a thermal conductivity less than metal, or may be an air gap.

In FIGS. 3, 4, and 4A, it is seen that working fluid 40 is sealed in fluid chamber 42 by cap 20 at one end. Sealing area or bore 33 may have multiple O-rings 33a/33b in grooves, which O-rings are urged against the outer wall of piston 38. One system of O-rings or other elastic material that has proved to be an effective seal to maintain the working fluid sealed in and to resist the pressure generated by expansion of the working fluid may be found in U.S. patent application Ser. No. 11/275,135, which is incorporated herein by reference.

Purge valve 10 may be placed on a water well close to the pressure switch, approximately 1/4" to 12" from the pressure switch in certain embodiments. The purge valve may be placed on or near the water softener control box or downstream of the water softener. In general, Applicant's novel purge valve may be used anywhere on any system where there is a need to prevent freeze-up of pipes.

Turning to FIGS. 3, 4, and 5, basically, the following summarizes some of the structure and functionality of the valve:

First body portion 30:
  Cylindrical, typically metallic, defines an inner chamber
  External surface exposed to ambient air; internal containing chamber 42 which contains the working fluid and removed end 38b of piston 38
  Sealing plug or cap 20 for sealing working fluid and pressure calibration (typically screw)
  Spring 44 to bias "open"
  Optional jacket or sleeve (see FIG. 5) for exterior of metallic cylinder Second body portion 32:
  May take any external or internal configuration within an internal water cavity/chamber 31
  Chamber 31 bordered longitudinally with sealing area (see below), and bypass port 36, and also containing a vertical trending purge port 37
  Metallic heat flow path between (among) $T_1$ of water in chamber 31, $T_2$ in cylinder (working fluid 40) first body portion 30, and $T_3$ (air) on exterior surface of second body portion 32 (see FIG. 4)

Sealing area or bore 33, located longitudinally between body portions 30 and 32 (see FIG. 4) for locating piston 38
  Multiple seals adapted to withstand pressure in system
  Seals on both sides of a leak vent 39 (prevent leakage) typically lubricant filled (prevents moisture and debris accumulation)
  O-rings 33a on working fluid side prevent leakage of the working fluid
  O-rings 33b on water side prevents leakage of water into a leak vent 39
  Use of an anti-seize/lubricant compound 33c (FIG. 4A), on and around the O-rings is preferably food/drug grade FIG. 3 shows purge valve 10 in the closed position. However, purge valve 10 in the closed position may have nose 38a of the piston past valve seat 34, that is to the right of the position of the nose with respect to the valve seat as seen in FIG. 3—such that in a closed position, the O-ring or other element defining valve seat 34 is on the cylindrical body portion of the piston. Regarding the valve seat, it may be an O-ring or other suitable elastomeric material. Regarding the O-rings 33a/33b or other sealing members of bore 33, they are made of an elastomeric material that does not dissolve or react with the working fluid, but provides an effective fluid seal against the body of the piston. Anti-seize/lubricant compound 33c, such as a food grade silicon-based composition, may be used on and around the piston/O-ring interface. FIG. 4A illustrates the use of a low temperature (below the freezing point of water), anti-seize/lubricant compound 33c around and between the multiple O-rings 33a/33b that the piston moves over.

Turning to FIGS. 5, 6, and 6A, an optional purge port tube 56 may be provided to remotely locate a removed end 56a from a near end 56b. Near end 56b is engaged with a fluid tight couple to the purge valve inlet. When purge valve 10 is in a closed position, the water softener, well water or other pressure source is in a normal (non-freezing environmental) condition, with the purge valve and all elements thereof "invisible" to the system. However, when the air temperature gets cold outside and first body portion 30 communicates a temperature drop by cooling the working fluid to freezing, the valve will then open and drain fluids out through bypass port 36 and purge port 37 and/or external drain tube 48. However, because of the use of purge port tube 56 placed in an annulus of pipe DS downstream of valve 10 and engaging the inlet of the second body portion 32, some of the purged fluid is being drawn from the remote removed end 56a and, therefore, flows all the way through the annulus between the tube 56 and the inner walls of the DS pipe purging it of cooling water and generating flow, with warmer fluid coming in and preventing freeze-up. Note that removed end 56a is typically located past where the pipe annulus enters the interior environment, whether that be just below ground or just inside a wall (see FIG. 6 or ghosted lines, FIG. 6A). In either case, the effect of using purge port tube 56 with removed end 56a located in a warmer non-ambient, non-outside air temperature environment is to maintain flow through all of the pipe annulus, even portions downstream of the purge port during cold weather. Arrows at A in FIG. 6A show flow of water when the valve gets cold and opens (piston and seat omitted).

Figure 7A:
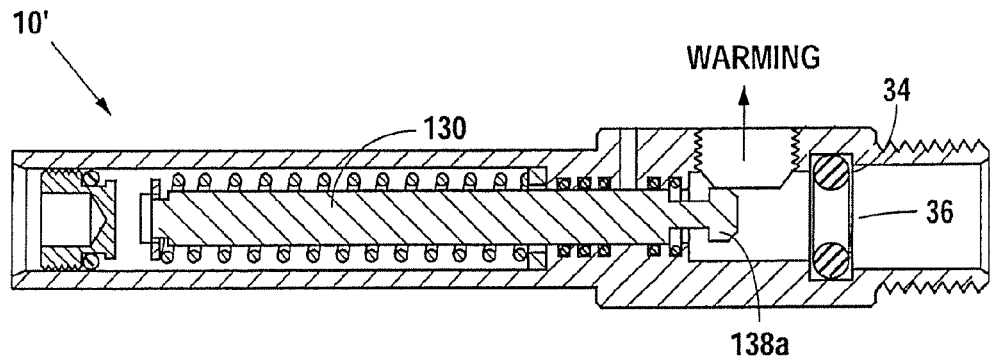
FIGS. 7A, 7B, and 7C provide cross-sectional cutaway views of another example embodiment of Applicant's present mechanical purge valve in three conditions.
Figure 7B:
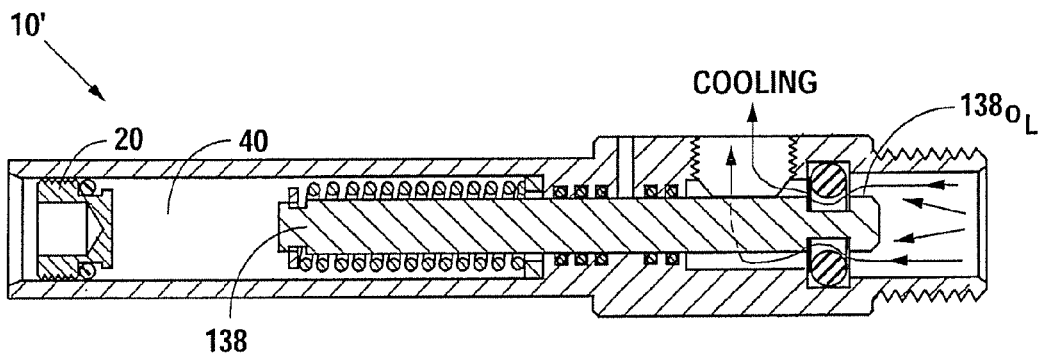
Figure 7C:
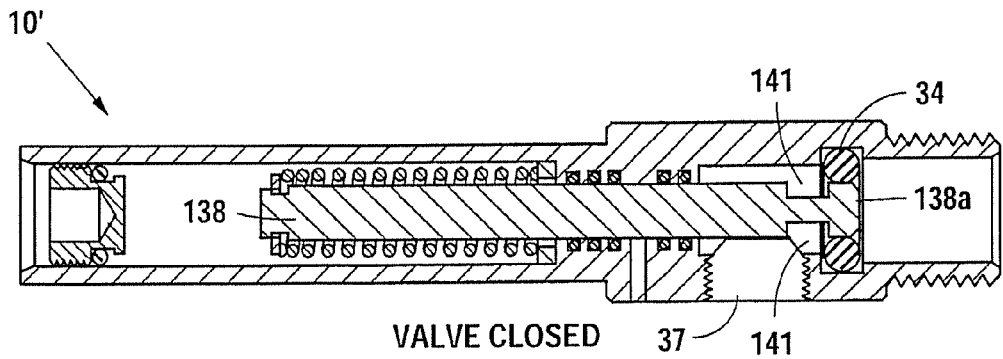

FIGS. 7A, 7B, and 7C illustrate an alternate embodiment 10' of Applicant's valve. Structurally, the difference in the previous embodiment (see, for example, FIGS. 3 and 4) lies in the structure of piston 138. In the alternate embodiment 10' of the valve, piston 138 is seen to have a nose 138a, which has an annular recess 141. The annular recess is dimensioned such that in a "valve warm" condition (FIG. 7B), wherein expansion of the working fluid 40 in chamber 42 has, through expansion responsive to the warm air/ambient water temperatures, pushed the tip of nose 138a past O-ring or valve seat 34, so that annular recess 141 is adjacent to the seat. This is the condition seen in FIG. 7B and it may be seen that cool fluid (relative to air temperature) may pass through the space created by the annular recess and out purge port 37 to provide water from the well or storage, which will typically be cooler, to elements downstream of drain port 37. In this manner, Applicant's alternate embodiment 10' acts to provide cool fluid, that is, cooler than air/ambient water temperature, to elements downstream of the valve. Embodiment 10' will also prevent freeze-up (see FIG. 7A) in the manner of valve 10.

Applicant has found that, in the summer, livestock, while thirsty and in need of water, are reluctant to drink water from a trough when the water in the trough is too warm. What Applicant provides therefor in an alternate embodiment 10' of the valve is the ability of the valve piston to "overshoot" the seat and place the annular recess 141 adjacent the seat and allow cooler water from tank 304 to flow into trough 306. Water in the tank 304 is typically cooler in the summer than the surrounding air temperature and the water temperature in the trough, and warmer in the winter than the surrounding air temperature and temperature of the trough, containing as it is, a large warm water received from the ground.

FIG. 8 illustrates a use of Applicant's alternate embodiment 10' in a livestock watering system 300. Livestock watering systems are used to provide water for livestock in pastures and feedlots and may comprise a water pump 302 engaging a water well 303. Water pump 302 may be a windmill using a mechanical pump as well known in the art of windmill water pumping. Pump 302 may also be electrical. As illustrated in FIG. 8, pump 302 may pump water from well 303 into an elevated tank or other water tank 304 (pressurized or gravity feed) for selectively supplying water to a nearby trough 306. A conduit 308 is typically provided with Applicant's valve, in either embodiment, but in the embodiment illustrated 10' at the removed end of conduit 308 and typically beneath water level WL of trough 306. In some cases, a parallel water feed system 310 may be provided to bring water to trough 306 responsive to water level or float valve 312. Such float valve 312 controlled water level systems are well known in the art. Applicant's system provides water to trough 306 separate from and not controlled by the float valve system, if one is present.

As is seen in FIG. 8, first body portion 30 and, in fact, the entire purge valve 10 or 10' may be submerged below typical water levels in the trough. However, the valve might be in air positioned so it drains water into the trough when opened. As seen in FIGS. 7A-7C, Applicant's valve 10' is adapted to provide water that is cooler or warmer than a preselected water temperature range. Typically, the water in the trough has a greater surface area exposed to cold or warm air temperatures than the larger volume of water in tank 304 and thus will reach a cooler or warmer temperature sooner than the storage tank in the same air temperature, humidity, and wind conditions. Thus, the valve open condition of FIG. 7A, which typically occurs at temperatures up to about 18° F. above the freezing point of water, will open and allow relatively warmer water from the tank 304 to enter the trough to prevent ice buildup when the air temperature is cool. When the air gets warm, it can warm the trough water and a condition as seen in FIG. 7B can result. This will allow cooler water to flow into the trough.

FIG. 9 illustrates threadably removable cap 20 adapted to engage the removed end of second body portion 32, so as to seal fluid chamber 42. Cap 20 may have a recessed tool receiving section 20a on an exterior surface thereof, and an annular recess 23 on the near end thereof for holding an O-ring 22 (see also FIG. 3).

FIG. 9 also illustrates a method of calibrating the piston so that it seats and unseats at the proper temperatures. In this method, the valve housing is held vertically in a fixed position and the working fluid, liquid at room temperature, is used to fill fluid chamber 42. At this point, the spring will have the piston fully retracted (see FIG. 4). In this method, the valve housing is typically held vertically in a fixed position and the working, liquid at room temperature, is used to fill the fluid chamber 42. At this point, the spring will have the piston fully retracted from the seat (see FIG. 4, for example). The spring is not under compression, the cap is off, and the fluid chamber is fully filled. The cap (which may be self-tapping) is then threaded in with rotor tool 317 until the O-ring 22 contacts the inner walls of the fluid chamber. Further rotation of the cap compresses the working fluid, then moves nose 38 until it is against a dial indicator gauge/limit switch 315 and/or limit switch. The dial indicator gauge/limit switch actuates to turn off the rotary tool 317 when the nose, at room temperature, has moved to the preselected position past the seat as indicated in FIG. 9. Further warming will simply move the nose slightly further down, as seen in FIG. 9, but the dial indicator gauge and/or limit switch 315 has properly positioned the nose with respect to the seat, such that the valve will unseat when the first set temperature, typically the freezing point or freezing range of the working material, is reached, opening the valve as seen in FIG. 4 or 7A.

The combination of a pressure switch with Applicant's mechanical or electrical purge valve in close proximity thereto, may be used in any suitable environment where the pressure switch may be exposed to ambient freezing conditions. Exemplary of these environments are the following: water wells, reverse osmosis systems, ice machines, water level controls (depth gauges and large tanks), aerobic septic systems, lawn sprinkler systems, fire sprinkler systems, geothermal AC systems, cooling tower AC systems, and gray water distribution systems. While the 0 to about 12 inches is measured typically from the diaphragm surface along the water path to the inlet of valve 10 or solenoid 126, other distances may be suitable, including preferably between about 2 to about 8 inches.

There are many instances where a valve that opens in response to a change in temperature allowing water flow is beneficial. One such instance is the protection of water pipes from freezing. Another instance is the freeze prevention of livestock drinking troughs that are subject to freezing conditions. In some cases, it is useful to use a fluid with a phase change melting point at the desired valve actuation temperature. Alkane paraffins may be commonly used, as they exhibit a large change in volume at their respective melting points and there are many to choose from.

One useful alkane that may be used in the construction of automatic water valves for freeze prevention is N-tetradecane with a melting point of 42° F. (4° C.), that is, above the freezing point of water. This freezing point may be lowered as desired by the addition of a suitable "antifreeze" such as N-dodecane.

In one embodiment, an alkane working fluid is contained in a chamber closed by a moveable piston rod at one end. As the alkane freezes, it contracts, allowing the piston to be urged by spring pressure to slide and open a water valve seat that is constructed at the other end of the piston rod. Upon warming, the alkane melts and expands sliding the piston rod against spring pressure to close the water valve seat.

For this device to be constructed, a slideable seal or stack assembly allowing movement of the piston rod but effectively separating the alkane working fluid from the water may be useful. Also a means of supporting the piston rod may be useful.

An object of the following embodiment is to provide a seal in the form of a stack assembly for the piston rod in a temperature responsive valve. With a stack assembly, sealing area or bore 33 typically no longer uses "O" rings 33a/33b (see FIG. 4), the sealing function being provided by the stack assembly located in the first body portion 30.

Figure 3C:
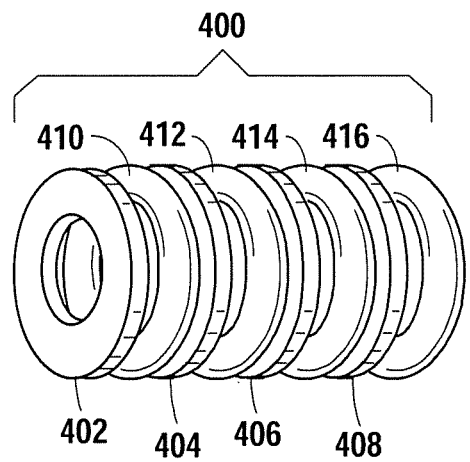
FIG. 3C is an exploded view of a stack assembly for use in the alternate preferred embodiment of the purge valve as set forth herein.

FIGS. 3A, 3B, and 3C illustrate an O-ring/washer seal stack assembly (hereinafter sometimes "stack assembly") 400 (Fig. C) and 400' (Figs. A and B). It typically comprises multiple alternating washers and O-rings for engagement upon a piston as set forth hereinbelow for providing, among other things, the O-rings for sealing against the passage of fluid past them and the washers or disks for helping compress the O-rings and for helping to locate the piston, and further for acting as a wiper with its inner diameter on the outer diameter of the piston.

FIG. 3C illustrates a stack assembly 400 comprising, from left to right, washer 402, O-ring 410, washer 404, O-ring 412, washer 406, O-ring 414, washer 408, and O-ring 416. The O-rings on either end, here O-rings 410/416, may sometimes be viewed as "primary" O-rings in that, in the manner of use as set forth more specifically below, O-ring 410 will seal against the passage of a pressurized fluid on its left from migrating across the O-ring to the right (see FIGS. 3A and 3B), for example, a fluid "A." At the other end of the stack, O-ring 416 may seal against the passage of a fluid on its right, say fluid "B," from migrating past it and moving to the left as seen in FIG. 3C. That is to say, stack assembly 400 may be used, in one embodiment, to assist in the prevention of a migration of fluids across the O-rings on either end. For example, when one fluid on the left of the O-ring to the left of the stack and a fluid on the right to the O-ring on the right end of the stack, these primary 410/416 or end placed O-rings will help prevent migration of fluid either way, but will be primary to the fluids outside of them (fluid to the left on element 410, FIG. 3C, and to the right of O-ring 416, FIG. 3C).

The primary, end placed O-rings 410/416 may be separated from, with washers (404/406/408, FIG. 3C; 404/406/408, FIG. 3B), one or more intermediate or backup O-rings (see 412 and 414, FIG. 3C; 412, FIGS. 3A and 3B). These backup or intermediate O-rings may be between the end placed O-rings and typically separated therefrom by washers. These are backup in the sense that, if the primary O-rings perform properly, they will maintain a fluid tight seal. However, should there be any leakage past the primary O-rings, the backup O-rings should prevent leakage either way, left or right, if there is leakage on either primary or end placed O-ring.

Figure 3D:
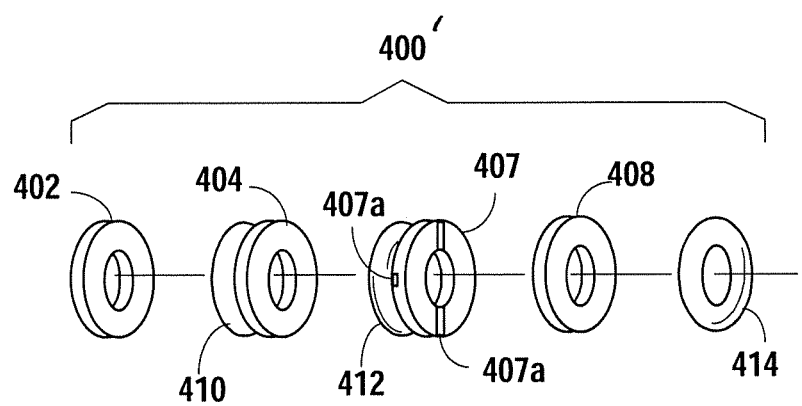
FIG. 3D is an exploded perspective view of an alternate preferred embodiment of a stack assembly.

FIGS. 3D and 3E illustrate an alternate preferred embodiment of stack assembly 400', here comprising, between the primary O-rings 410/416, a slotted washer/unclotted washer pair 407/408, which slotted washer/unslotted washer combination 407/408 includes one slotted washer 407 with slots 407a (see FIG. 3D). Slots 407a are radially cut partly into one or both side walls between the inner diameter and the outer diameter. The function of the slots is to help allow the passage (should either primary O-ring leak) to assist in the passage of a fluid through the stack assembly for, preferably, flow out of vent 39 (see FIGS. 3A, 3B, and 4). This vent helps prevent the fluids from mixing.

For example, FIGS. 3A and 3B both illustrate a valve having the slotted washer/non-slotted washer 407/408 combination, that is, stack assembly 400'. Turning to FIG. 3A, it may be seen that, if, for example, water on the right side of O-ring 414 leaks through O-ring 414, it will, in squeezing past washer 408, work its way through slot or slots 407a in washer 407 and will find the easiest passage is out leak vent 39, rather than past either O-ring 410 or 412. Likewise, as seen in FIG. 3B, tetradecane 40 or other working fluid in fluid chamber 42 where the stack assembly is located may bypass O-ring 410, if O-ring 410 is faulty and backup O-ring 412 is faulty, but will then more easily work its way out vent 39. This helps avoid contamination across pressure zones separating different fluids in the event that there may be O-ring failure. In addition, the washers at their inner diameters tend to act as wipers on the outer surface of piston 38 as the piston, responsive to volumetric changes in the fluid chamber of the fluid, moves to the left and right between opened and closed positions.

Figure 11A:
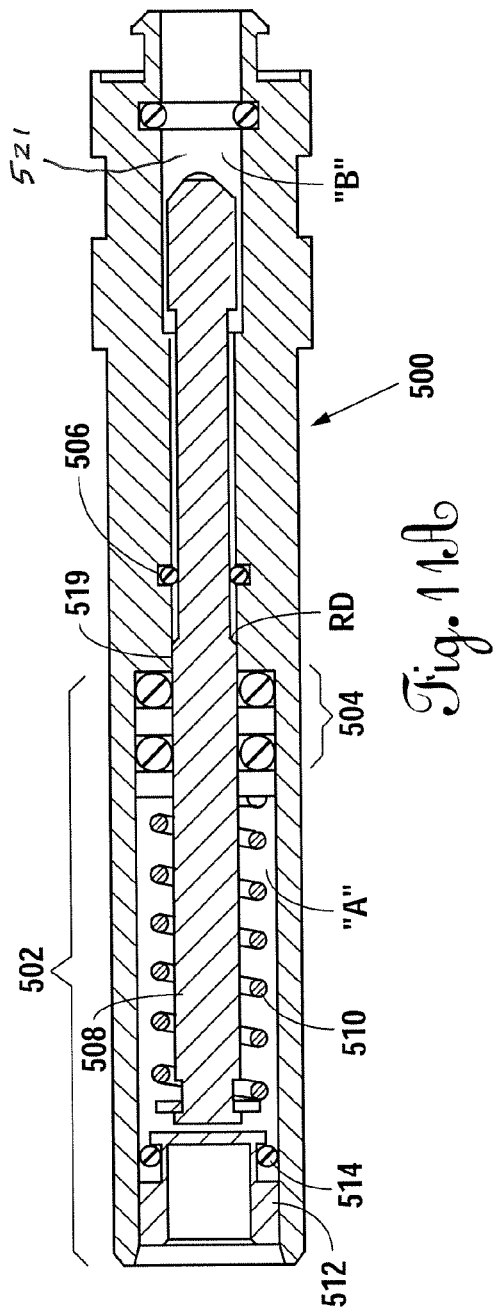
FIGS. 11A and 11B illustrate an alternate preferred embodiment of the stack assembly
Figure 11B:
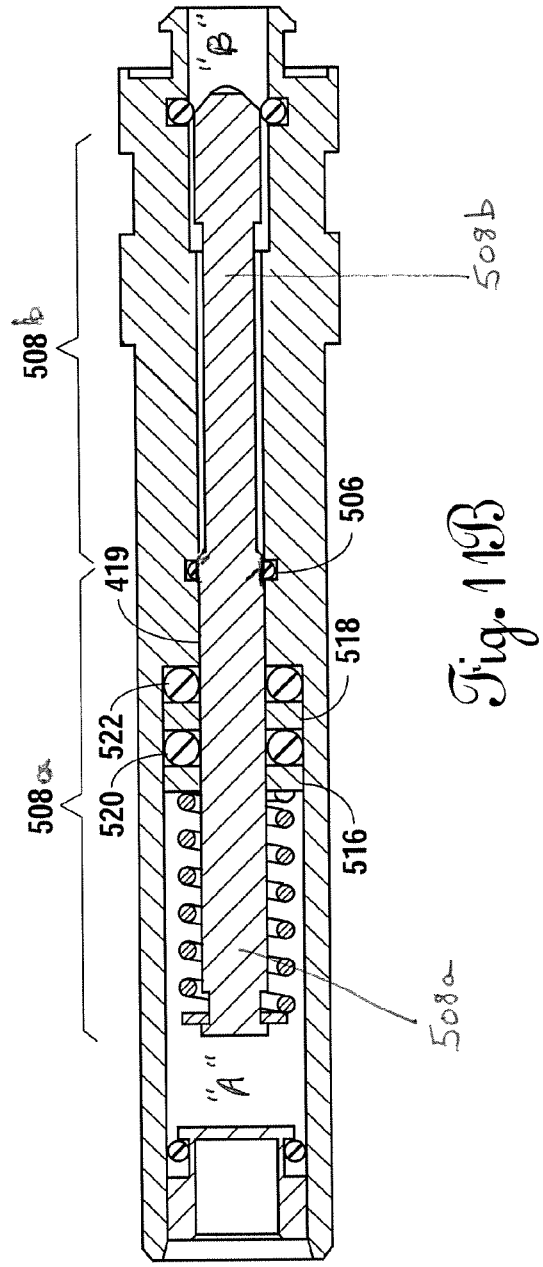

Turning back to FIGS. 3A and 3B, one may see that working fluid is located in a fluid chamber, which fluid chamber is substantially defined by the space to the left bore 419, the bore bearing part of piston 38, which has one end in the working fluid chamber, and the other end in the valved fluid chamber (see also FIG. 11B). Moreover, it is seen that washer 402, the first washer to the left of O-ring 410, acts not only to help locate O-ring 410, but to seat the removed or right end of spring 44. This may be compared to FIG. 3 or 4 above in which spring 44 simply seats to the end of chamber 42. Indeed, FIGS. 3 and 4 compared to FIGS. 3A and 3B indicate that the O-ring sets 33a/33b as seen in FIG. 3, which perform sealing functions to separate water and tetradecane, may be removed and replaced as seen in FIGS. 3A and 3B with a single stack 400 or 400' (slotted), in which there are at least two end or primary O-rings, here 410/414, which are spaced to either side of vent 39 and, in one embodiment, a vented set of washers, here slotted 407/unslotted 408, adjacent vent 39, so as to help any leaked fluid bypassing either primary O-ring into vent 39.

The use of Applicant's seal stock eliminates a machining step, that of machine the grooves for O-ring sets 33a/33b in FIG. 4. Indeed, there are no O-ring grooves in FIGS. 3A and 3B, the O-rings acting as part of a stack and located in the fluid chamber. "Effective" fluid chamber may be deemed by length 442 (where the fluid meets the first O-ring), but the machined fluid chamber, which carries the spring acting on the piston end and the stack assembly 400/400', which in turn acts on the removed end of the machined fluid chamber 42, extends past vent 39, vent 39 being isolated on the alkane side by at least primary O-ring 410 and back up 412, and on the water side by at least primary O-ring 414.

The inner diameter of a washer may be greater by about 4 mil (about 2 mil per side) when compared to the OD of the piston. The outer diameter of the washer may be about 2 mil less than the inner diameter of the working fluid chamber (about 1 mil per side). The O-ring inner diameter compared to the piston outer diameter may be greater by about 6 to 8 mil (about 3 to 4 mil per side).

The environment in which the stack assembly may be used is any environment in which O-rings are used in conjunction with a piston to separate different fluids under pressure. One such environment is that of the freeze plug as used in the figures set forth elsewhere in this application.

FIGS. 10A, B and C illustrate an integrated rod seal 400" in which the multiplicity of ribs 420/422/424/426 are interspersed with a multiplicity of spacers 428/430/432, the ribs and spacers integral with one another and coupled to the piston (see FIG. 10C).

By integral or one-piece means that, unlike the previous embodiments, where there were separate O-rings and washers—instead there are elastomeric protrusions 420/422/424/426 which are connected by an integral width-wise spacer elements 428/430/432. The protruding elements may be elastomeric and may be ribs and the entire structure may be molded in one piece of elastomeric material, such as rubber or rubberlike material having, in one embodiment, a hardness of durometer of about 80 to 90. As seen in FIG. 10C, a protective washer 431 may be used between the sleeve-like integral stack 400', which is entrained upon the piston. As can be seen in FIG. 10C, there are still primary rib elements, one the rib all the way to the left (420) and all the way to the right (426) and at least one secondary rib (two in FIG. 10A, one in FIG. 10C).

In one embodiment, the material is molded and about 80-90 durometer. Ribs extend both outward and inward like a stack of O-rings integrated or glued together. The multiple ribs of the one piece seal 400" may wipe the rod multiple times with a minimum of drag. Drag is often a problem with sealing. Wall clearance may be about 0.005 inches per side, inside and outside the groove on the spaces between the raised ribs.

Seal stack assembly 400/400'/400" is useful as a seal in various valves, including those set forth in this application, and may consist of, in one embodiment, at least three elements:

1. At least one elastomeric element, such as an O-ring or other flexible seal;
2. At least one hard washer of plastic or metal close fitting between the bore of a chamber and the outer diameter of a piston rod;
3. A spring to compress the seal stack.

Multiple elastomeric elements may be stacked, alternately, with hard elements as necessary, each performing specific function, such as to provide:

1. Sealing from leakage or contamination between a working fluid chamber and outside environment consisting of water at atmosphere;
2. Redundant sealing to provide backup for number 1 above;
3. Wiping of the rod to help ensure debris does not damage sealing O-rings.

Hard washers (such as nylon, Delrin® or Teflon®) may be inserted between elastomeric elements as required to provide:

1. Centering of piston OD (outer diameter) in chamber bore;
2. Distribute spring pressure compressing the stack; and
3. Provide two point support for piston rod to help keep it centered;
4. Additional scraping and wiping of rod by the hard washers will ensure debris cannot damage sealing O-rings.

FIGS. 11A and 11B illustrate in an alternate preferred embodiment useful for temperature responsive valves, a machined body 500 that may include a working fluid chamber 502 for containing a piston 508 and spring 510. FIGS. 11A and 11B illustrate machined body 500 in which there is a working fluid chamber 502, the working fluid chamber 502 containing piston 508 and a spring 510 as in other embodiments illustrated herein. An end cap 512 and O-ring 514 may contain a working fluid, such as tetradecane or other alcane, here designated fluid "A", from a separate fluid "B," which may be, in one embodiment, water. Piston 508 is seen to comprise two sections 508a/508b, section 508b having a smaller diameter where it engages section 508a. Captured O-ring 506 is captured in a groove machined in body 500, unlike the O-rings of the stack assemblies set forth herein which ride in the chamber for the working fluid. Moreover, it is seen in the valve opened position (FIG. 11A), O-ring 522 is a primary O-ring, as fluid will bypass O-ring 506, as O-ring 506 in the valve opened position is slightly spaced apart from the outer diameter of section 508b of the piston. However, in a piston closed position (FIG. 11B), O-ring 506 is sealing against leakage of fluid B from right to left as seen in FIG. 11B. In either valve opened or valve closed position, O-ring 520 of stack assembly 504 is the primary O-ring to the left in the valve closed or valve opened positions while maintaining a seal to keep fluid A, in one embodiment, tetradecane, to the left of the O-ring.

A bore 519 is provided between working fluid chamber 502 having a working fluid such as tetradecane and valved chamber 521 which may contain a valved fluid such as Fluid "B." The spring is entrained on a first end of the piston, for example, the first end of the piston in the working fluid chamber and up against the stack assembly 504. Stack assembly 504 may include a primary O-ring 520 and a secondary O-ring 522, which may be flush against a bore end of the working fluid chamber. Washers 516 and 518 are provided first washer 516 for seating the spring thereto.

Spring 510 urges stack assembly 504 against the bore end wall of the working chamber as illustrated and temperature and phase change of a working fluid such as tetradecane causes the piston to move to the right (warming, expanding, FIG. 11B) or to the left (cooling, contracting, FIG. 11A). In the operation of valve shown in FIGS. 11A and 11B, it is seen that when the valve is closed bore mounted O-ring 506 acts a primary for the movement of any fluid therepast (from right to left as seen in FIG. 11B). On the other hand, when the valve is open as seen in FIG. 11A, and stack O-ring 522 is a primary, O-ring 520 is a second primary and there is no secondary inbetween.

Any parts of the valve may be made of plastic or metal, in one embodiment, the piston is metal, for example, stainless steel or copper, to enhance thermal conductivity. In another embodiment, the housing comprising the body portions or any other parts disclosed herein may be made of tough, durable plastic, such as an acetal plastic (such as Delrin®).

Although the invention has been described with reference to specific embodiments, this description is not meant to be construed in a limiting sense. On the contrary, various modifications of the disclosed embodiments will become apparent to those skilled in the art upon reference to the description of the invention. The number or order of O-rings or washers may be varied as necessary or combined with the integrated seal for specific requirements. It is therefore contemplated that the appended claims will cover such modifications, alternatives, and equivalents that fall within the true spirit and scope of the invention.

The invention claimed is:

1. In a valve having a body with a sealed working fluid chamber, a bore and a valved fluid chamber, the valved fluid chamber having an inlet and outlet and a seat between the inlet and the outlet, a piston, the piston for extending through the bore from the working fluid chamber to the valved fluid chamber, a spring for biasing the piston away from the seat and a working fluid for receipt in the working fluid chamber improvement comprising:
  a seal stack assembly for entrainment, under compression, upon the piston and in the working fluid chamber between a working fluid chamber end wall and a first end of the piston, wherein the first end of the piston is located in the working fluid chamber and a second end in the valved fluid chamber proximate the seat such that temperature changes cause the piston to move responsive to expansion and contraction of the working fluid between a seated and an unseated position, the unseated position for the passage of a fluid past the seat; wherein the seal stack assembly comprises at least one elastomeric element and adjacent thereto, one hard element, both elements entrained upon the piston such that the spring urges the piston away from the seat; wherein the hard element is a washer with at least one slot in a side wall thereof.

2. A thermally actuated valve comprising:
  a housing having walls defining an inlet adapted to receive water under pressure, an outlet, a first chamber fluidly connecting the inlet to the outlet, a second chamber having a near end and a removed end, walls defining a bore separating the first chamber from the second, longitudinal chamber;
  a resilient seat defining a seat plane, the seat for engaging the housing, the seat adjacent the inlet of the first chamber of the housing;
  a piston having a first end that includes a nose and a second end and a longitudinal axis, the piston partially disposed in the first chamber, partially and slidably disposed in the bore, and partially disposed in the second chamber, the piston's longitudinal axis aligned substantially perpendicular to the seat plane;
  a spring for engaging the piston, so as to bias the piston towards the removed end of the second chamber;
  a seal stack assembly for fluid sealing between the piston and walls of the second longitudinal chamber and sandwiched under compression between the spring and walls of the second chamber to prevent fluid transfer between the first chamber and the second chamber; and
  a working material sealed in the second chamber capable of moving the piston responsive to temperature changes between a seated position and an unseated position;
  wherein the seal stack assembly comprises: a washer for receipt onto the piston and for receiving one end of the spring against a first surface thereof;
  a first "O" ring;
  a second washer; and
  a second "O" ring,
  the "O" rings and washers located between the one end of the spring and the walls of the second chamber, and sandwiched under compression by the spring
  wherein at least one of the washers is slotted and further including a vent in the second chamber proximate the slotted washer.

3. A thermally actuated valve comprising:
  a housing having walls defining an inlet adapted to receive water under pressure, an outlet, a first chamber fluidly connecting the inlet to the outlet, a second chamber having a near end and a removed end, walls defining a bore separating the first chamber from the second, longitudinal chamber;
  a resilient seat defining a seat plane, the seat for engaging the housing, the seat adjacent the inlet of the first chamber of the housing;
  a piston having a first end that includes a nose and a second end and a longitudinal axis, the piston partially disposed in the first chamber, partially and slidably disposed in the bore, and partially disposed in the second chamber, the piston's longitudinal axis aligned substantially perpendicular to the seat plane;
  a spring for engaging the piston, so as to bias the piston towards the removed end of the second chamber;
  a seal stack assembly for fluid sealing between the piston and walls of the second longitudinal chamber and sandwiched under compression between the spring and walls of the second chamber to prevent fluid transfer between the first chamber and the second chamber; and
  a working material sealed in the second chamber capable of moving the piston responsive to temperature changes between a seated position and an unseated position;
  wherein the seal stack assembly comprises:
  a washer for receipt onto the piston and for receiving one end of the spring against a first surface thereof;
  a first "O" ring;
  a second washer; and
  a second "O" ring;
  the "O" rings and washers located between the one end of the spring and the walls of the second chamber, and sandwiched under compression by the spring; and
  wherein at least one of the washers is slotted and further including a vent in
  the second chamber proximate the slotted washer.

4. In a valve having a body with a sealed working fluid chamber, a bore and a valved fluid chamber, the valved fluid chamber having an inlet and outlet and a seat between the inlet and the outlet, a piston, the piston for extending through the bore from the working fluid chamber to the valved fluid chamber, a spring for biasing the piston away from the seat and a working fluid for receipt in the working fluid chamber improvement comprising:

a seal stack assembly for entrainment, under compression, upon the piston and in the working fluid chamber between a working fluid chamber end wall and a first end of the piston, wherein the first end of the piston is located in the working fluid chamber and a second end in the valved fluid chamber proximate the seat such that temperature changes cause the piston to move responsive to expansion and contraction of the working fluid between a seated and an unseated position, the unseated position for the passage of a fluid past the seat; and wherein the seal stack assembly comprises at least a first washer for receipt of the spring thereagainst, a first "O" ring for laying flush against the first washer, a second washer, sandwiched between a second "O" ring and the first "O" ring;

wherein at least one of the washers is slotted.

5. The valve of claim 4, wherein the working fluid chamber includes a vent located proximate the seal stack assembly.

6. The valve of claim 5, further including a third washer adjacent the second "O" ring.

7. In a valve having a body with a sealed working fluid chamber, a bore and a valved fluid chamber, the valved fluid chamber having an inlet and outlet and a seat between the inlet and the outlet, a piston, the piston for extending through the bore from the working fluid chamber to the valved fluid chamber, a spring for biasing the piston away from the seat and a working fluid for receipt in the working fluid chamber improvement comprising:

a seal stack assembly for entrainment, under compression, upon the piston and in the working fluid chamber between a working fluid chamber end wall and a first end of the piston, wherein the first end of the piston is located in the working fluid chamber and a second end in the valved fluid chamber proximate the seat such that temperature changes cause the piston to move responsive to expansion and contraction of the working fluid between a seated and an unseated position, the unseated position for the passage of a fluid past the seat; and wherein the seal stack assembly comprises at least a first washer for receipt of the spring thereagainst, a first "O" ring for laying flush against the first washer, a second washer, sandwiched between a second "O" ring and the first "O" ring; further including a third washer adjacent the second "O" ring wherein the third washer is slotted.

8. The valve of claim 7, further including a vent proximate the slotted washer.

9. The valve of claim 8, further including a fourth washer adjacent the third washer.

* * * * *